United States Patent
Kowalik (10) Patent No.: US 7,014,485 B1
(45) Date of Patent: Mar. 21, 2006

(54) METHOD AND APPARATUS FOR CONCEALING WIRES AT THE FRONT END OF A MOTORCYCLE

(76) Inventor: Henry Francis Kowalik, 2410 8th Ave. NE., Naples, FL (US) 34120

( * ) Notice: Subject to any disclaimer, the term of this patent is extended or adjusted under 35 U.S.C. 154(b) by 0 days.

(21) Appl. No.: 11/006,417

(22) Filed: Dec. 7, 2004

(51) Int. Cl.
H01R 4/60 (2006.01)

(52) U.S. Cl. .................. 439/210; 439/110; 307/9.1
(58) Field of Classification Search ........ 439/209–210, 439/110; 307/9.1
See application file for complete search history.

(56) References Cited

U.S. PATENT DOCUMENTS

| | | | |
|---|---|---|---|
| 126,366 A | 4/1872 | Wills | |
| 3,202,036 A | 8/1965 | Simko | |
| 3,457,573 A | 7/1969 | Patyna et al. | |
| 4,229,662 A | 10/1980 | Nashimoto | |
| 4,746,302 A | 5/1988 | Brown | |
| 5,651,481 A | 7/1997 | Jensen | |
| 5,869,907 A | 2/1999 | Marler | |
| 6,122,991 A * | 9/2000 | Clarkson | 74/551.8 |
| 6,158,279 A | 12/2000 | Saiki | |
| 6,566,998 B1 | 5/2003 | Facory | |
| 6,764,206 B1 * | 7/2004 | Felty | 362/476 |
| 6,806,587 B1 * | 10/2004 | Konno et al. | 307/9.1 |

FOREIGN PATENT DOCUMENTS

| | | |
|---|---|---|
| ES | 2.151.363 | 12/2000 |
| JP | 11165672 | 6/1999 |
| JP | 2001128056 | 5/2000 |

* cited by examiner

Primary Examiner—Truc Nguyen
(74) Attorney, Agent, or Firm—Michael I Kroll (57) ABSTRACT

An apparatus for concealing wires in a riser of a motorcycle comprising a throughbore extending along a length of the riser thereby forming a first channel therein. A handlebar includes a second channel extending therethrough and an egress aperture extending through the second channel aligned with a first end of the throughbore. A bolt having a bolt channel extending therethough is received within a second end of the throughbore for securing the riser to a wheel guard. Wires connecting at least two electronic components are received within the second channel and extend further through the egress aperture and through the throughbore and further out from the bolt channel thereby concealing the wires within the handlebars and the riser.

17 Claims, 7 Drawing Sheets

METHOD AND APPARATUS FOR CONCEALING WIRES AT THE FRONT END OF A MOTORCYCLE

BACKGROUND OF THE INVENTION

1. Field of the Invention

The present invention relates generally to motorcycle wiring and, more specifically, to a method and apparatus for running and concealing wires on the front end of a motorcycle. The apparatus includes wiring channels extending through each of the handle bars and the riser for concealing wires therein. The channels are sealed by a covering device and locked using bolts thereby providing a cleaner appearance while protecting the wires from damage that may occur if exposed.

2. Description of the Prior Art

There are other wiring methods designed for the same purpose. Typical of these is U.S. Pat. No. 126,366 issued to Wills on Apr. 30, 1872. Another patent was issued to Simko on May 9, 1961 as U.S. Pat. No. 3,202,036. Yet another was issued on Apr. 25, 1967 as U.S. Pat. No. 3,457,573 to S. T. Patyna et al.

Yet another Patent was issued as U.S. Pat. No. 4,229,662 issued to Nashimoto on Oct. 21, 1980. Another patent was issued to Brown on May 24, 1988 as U.S. Pat. No. 4,746,302. Yet another was U.S. Pat. No. 5,869,907 was issued to Marler on Feb. 9, 1999 and still yet another was issued on Dec. 12, 2000 to Saiki as U.S. Pat. No. 6,158,279.

Another Patent was issued to Facory on May 20, 2003 as U.S. Pat. No. 6,566,998 B1. Yet another patent was issued as Japanese Patent No. JP10152086 to Eisuke et al on Jun. 9, 1998. Still yet another Patent was issued to Kazuhiko et al on Jun. 22, 1999 as Japanese Patent No. JP11165672.

Another patent was issued on May 5, 2005 as Japanese Patent No. JP2000128056 to Masaaki et al.

U.S. Pat. No. 126,366

Inventor: Edwin S. Wills

Issued: Apr. 30, 1872

The spoon-point D on the end of the screw for boring and tapping the wood, substantially as described.

U.S. Pat. No. 3,202,036

Inventor: John J. Simko

Issued May 9, 1961

As an article of commerce, a structural type blind fastener of the bolt or screw type adapted to be driven to a predetermined torque in securing together a plurality of structures having aligned apertures therein forming a passage there through accessible from only one side: a first member comprising a cylindrical body having an external thread and a circular head at one end provided with a bearing face inclined outwardly away from said body, a driving connection at the end of said body opposite-said head, and a weakened section between said body and said driving connection adapted to break when subjected to a predetermined torque; a second member comprising an internally threaded cylindrical tubular-like body portion having an outside diameter substantially equal to the diameter of said head of said first member threaded onto said cylindrical body of said first member and an integral head at the end of said tubular-like body remote from said head of said first member, said head of said first member being located without the adjacent end of said second member and adapted to be drawn therein to expand said adjacent end of said second member upon relative axial movement between said members incident to setting or driving the fastener; the major portion of said exterior and interior threads of said first and second members interengaging with clearance fit, as defined in Handbook H28 (1957), National 'Bureau of Standards; a formed annular groove in said tubular-like body portion of said second member produced with said first and second members assembled with one another as aforesaid; and at least one uninterrupted annular portion of limited axial length of said exterior and interior threads of said first and second members formed by the inward deformation of the metal of said tubular-like body portion of said second member by the formation of said groove therein, interengaging with an interference fit, as defined by said handbook, forming; a friction-type thread interference lock between said first and second members.

U.S. Pat. No. 3,457,573

Inventor: S. T. Patyna et al

Issued: Apr. 25, 1967

A method for forming a hollow bolt having a low profile head and adapted for internal wrenching from either end which comprises positioning a tubular bolt blank within a female die, said bolt blank having an internal surface describing a channel extending therethrough, the depth of the forming cavity of said female die and the length of said bolt blank being interrelated in a manner such that when said bolt blank is seated within said female die the lip comprising one end of said bolt blank protrudes from the forming cavity of said female die a distance at least sufficient for forming the head of said bolt therefrom, inserting a male die into said channel of said tubular bolt blank through the orifice formed by said lip, moving said male die through at least a substantial portion of the length of said channel, the external surfaces of said male die and the internal surfaces of said female die being constructed and arranged in a manner such that the movement of said male die through said portion of the length of said channel substantially changes the diameter of a longitudinally-extending portion of said bolt blank, deforms a portion of said internal surface so as to provide thereon a longitudinally-extending wrenching surface for use in seating the completed bolt within a threaded aperture, and forming a bolt head from said lip by rolling back said lip in the direction of the opposite end of said bolt blank, and threading a portion of the external surface of said bolt.

U.S. Pat. No. 4,229,662

Inventor: Ryo Nashimoto

Issued: Oct. 21, 1980

Wiring of electrical equipment for motorcycles having a battery for current source provided in the central part of the body of a motorcycle. A plurality of electrical loads are connected to the battery, and a plurality of sub-fuses are connected to each electrical load. In order to simplify the wiring and to facilitate the wiring installation as well as maintenance, the sub-fuses are concentratedly provided in position proximal a steering stem of the motorcycle.

U.S. Pat. No. 4,746,302

Inventor: Charles E. Brown

Issued: May 24, 1988

An insulating bolt is disclosed herein for use in supporting signs on walls comprising a hollow threaded shaft having a channel disposed on the shaft to receive a grounding strap which is laid in the channel. The end of the grounding strap conforms to the end of the shaft of the bolt for engaging into the end of an armored cable thus providing grounding means from the sign back to the power source. A slide locking nut having a raised shoulder for sliding in the channel is provided for positioning and holding the bolt in place.

U.S. Pat. No. 5,869,907

Inventor: Rick A. Marler

Issued: Feb. 9, 1999

A modular wiring harness is provided for a vehicle including a frame and an electrical system with electrical source devices, operating devices and switching. The wiring harness includes a wiring network connected to the electrical system devices and switching and to system and power module thereof. The system module connects electrical control components at a compact, direct-connection circuit board within the enclosure. The power relay also includes electrical control components, including a circuit breaker and a starter relay, which are connected to the wiring network. A mounting system is provided for mounting the wiring harness on various types of vehicles, including different models of motorcycles.

U.S. Pat. No. 6,158,279

Inventor: Terunari Saiki

Issued: Dec. 12, 2000

In a headlight integral with a speedometer the rigidity of the headlight case is ensured while making the headlight water and dust-proof. A meter hole is formed in the upper surface of a headlight case which constitutes a headlight, a speedometer is inserted into the meter hole from above and is secured to the headlight case through a meter stay in the interior of the headlight case. In addition, a meter cord and bulb cord are put together and extend between the exterior and the interior through a wiring hole formed in the rear portion of the headlight case.

U.S. Pat. No. 6,566,998

Inventor: Omar Facory

Issued: May 20, 2003

For remotely operating security barriers such as gates, garage doors and the like by manipulating multiple pre-existing equipment controls of a motor vehicle simultaneously or successively, a vehicle-integrated access control device is described having an access control signal transmitter, an optional voltage regulator, and means for causing the operation of the transmitter to depend on the actuation in concert of several vehicle controls such as, for example, the simultaneous or rapidly successive actuation of the left and right turn signals of a motorcycle. A logical AND device and, alternatively, a pair of transistor switches are disclosed for establishing the dependency. One or more optional relays are disclosed for establishing the dependency. A latching circuit is described for establishing the dependency upon successive actuation of first and second circuits. Wires connected to the vehicle are disclosed for establishing input from the vehicle controls, power from the vehicle electrical system, and electrical grounding. A voltage reducing circuit, optionally including a voltage divider or a Zener diode, is disclosed for accommodating a lower voltage transmitter to a higher voltage vehicle electrical system.

Japanese Patent Number JP10152086

Inventor: Matsushita Eisuke et al

Issued: Jun. 9, 1998

PROBLEM TO BE SOLVED: To provide the wiring structure of wires with high appearance quality and easy to design.

SOLUTION: A fuel tank 8 is disposed between main frames 7 with a longitudinal section which extends rearwards in a pair horizontally from a head pipe 5, and the front end proximity part of a fuel tank 8 is formed into a cut-shaped part 33 to form a clearance 35 between the main frames 7, where a throttle wire 23 (wires 20) which extends forward from under the fuel tank 8 is passed, extended so as to direct the upper end direction of the head pipe 5 while being guided by a gusset 24, and connected to the handle bar side.

Japanese Patent Number JP11165672

Inventor: Nakao Kazuhiko et al

Issued: Jun. 22, 1999

PROBLEM TO BE SOLVED: To conduct wiring work easily and completely for a meter supported on a handlebar cover for a motor cycle.

SOLUTION: The housing 41 of a meter unit 5 is inserted in a meter unit supporting hole 43 formed at a rear handlebar cover 1 from the above, and the locking claw 413 of a housing 41 is engaged with the part 19 to be locked of the rear handlebar cover 1 so as to be capable of being locked. Inside the rear handlebar cover 1, a male connector 25 is fitted in advance. When the housing 41 of the meter unit 5 is inserted in the meter unit supporting hole 43, a female connector 44 formed at the housing 41 is automatically connected to the male connector 25 to complete connection work for the meter unit 5.

Japanese Patent Number JP2000128056

Inventor: Kuwata Masaaki et al

Issued: May, 5, 2000

PROBLEM TO BE SOLVED: To provide a structure for wiring a lead wire around a handle of a motorcycle, improving appearance around the handle without any decreased in handlebar strength.

SOLUTION: Rivets a head of nail shape are welded at periphery of frontal lower face of a handlebar 5. Clamps 30 which support a lead wire 21 extending from a handle switch 19 engaged with these rivets to be retained. The lead wire 21 supported by the clamps 30 is wired at a periphery of the frontal lower face of the handlebar 5 along the axial direction of the handlebar 5. With this arrangement, because the lead wire 21 is hidden from the rider's view. Also, because no band is utilized for the support of the lead wire, the appearance around the handlebar 5 is improved. Further, because there is no need to provide that handlebar 5 with holes through which the lead wire 21 passes, any reduction in strength of he handlebar 5 can be avoided.

While these wiring methods may be suitable for the purpose for which they were designed, they would not be as suitable for the purpose of the present invention, as hereinafter described.

SUMMARY OF THE PRESENT INVENTION

The present invention relates generally to motorcycle wiring and, more specifically, to a method and apparatus for running and concealing wires on the front end of a motorcycle. The apparatus includes wiring channels extending through each of the handle bars and the riser for concealing wires therein. The channels are sealed by a covering device and locked using bolts thereby providing a cleaner appearance while protecting the wires from damage that may occur if exposed.

A primary object of the present invention is to provide a method and apparatus for concealing the wires of a motorcycle that overcomes the shortcomings of the prior art.

Another object of the present invention is to provide a method and apparatus for concealing the wires of a motorcycle wherein the wires are run through the riser thereof.

Still another object of the present invention is to provide a method and apparatus for concealing the wires of a motorcycle including a billet cover with stud that attaches to a riser cover.

Still another object of the present invention is to provide a method and apparatus for concealing the wires of a motorcycle having a wiring channel extending through each of the handle bars and the riser for retaining and running wires therethrough.

A further object of the present invention is to provide a method and apparatus for concealing the wires of a motorcycle wherein the wiring channel extending through the handlebars has an egress aperture positioned at substantially at a center point aligned with a first open end of the riser channel.

Another object of the present invention is to provide a method and apparatus for concealing the wires of a motorcycle including a bolt with a throughbore for allowing wires to egress from the riser wiring channel.

Yet another object of the present invention is to provide a method and apparatus for concealing the wires of a motorcycle that is simple and easy to use.

Still yet another object of the present invention is to provide a method and apparatus for concealing the wires of a motorcycle that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the wire concealing apparatus of the present invention. With regard to the reference numerals used, the following numbering is used throughout the various drawing figures.

10 wire concealing apparatus of the present invention
12 riser
14 handle bar
16 wheel guard
18 riser cap
20 stud apperture
22 billet cover
24 stud
26 bolt
27 threads
28 washer
29 lock nut
30 bore
32 wires
34 bottom end
36 top end
38 bottom indent
40 top indent
42 bolt apperture
44 bolt
46 handle bar channel
48 egress aperture
50 riser channel

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 5 illustrate the package opener of the present invention which is indicated generally by the numeral 10.

Figure 1:
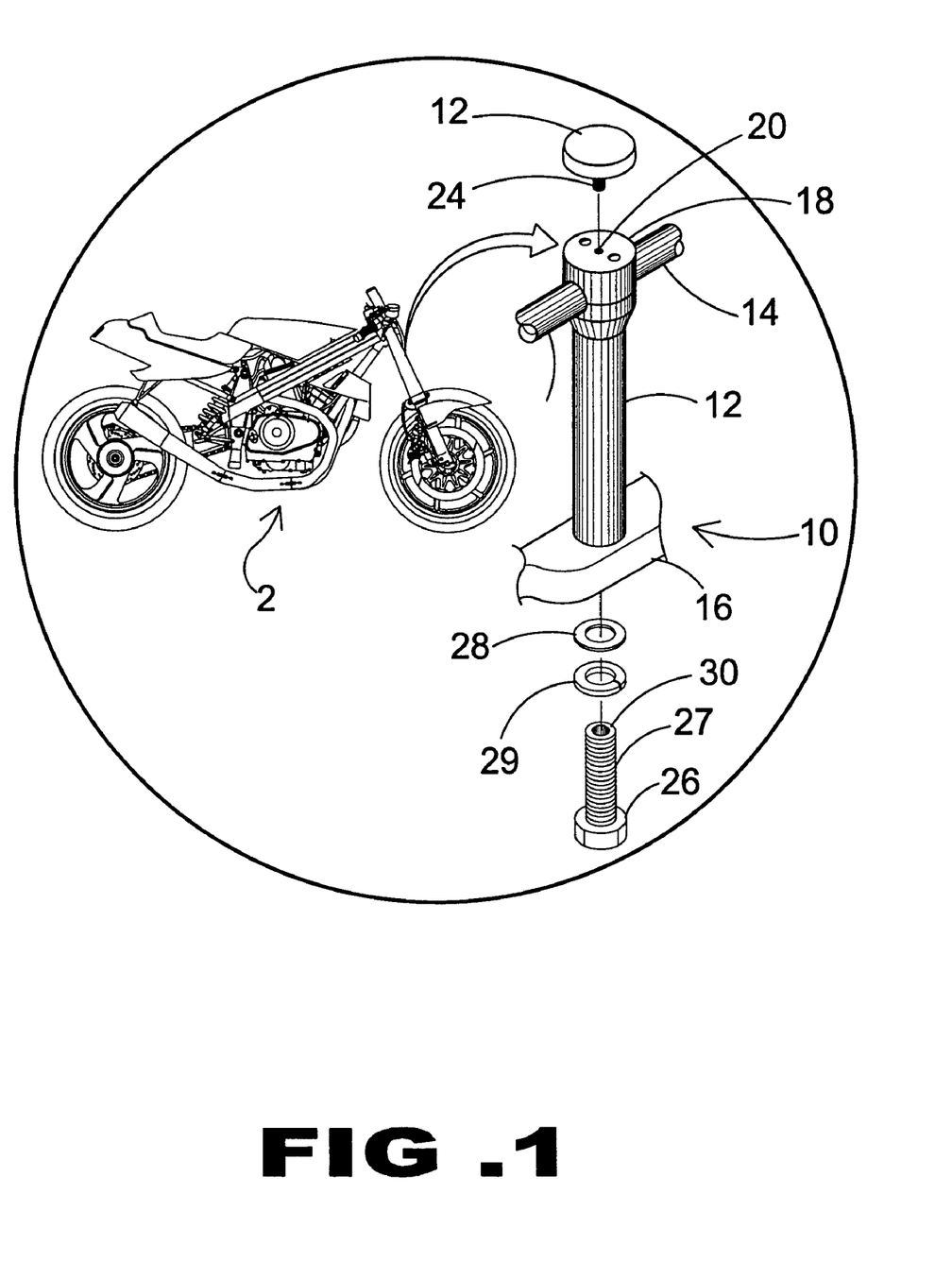
FIG. 1 is an illustrative view of the wiring concealing apparatus of the present invention.

FIG. 1 is an illustrative view of the wiring concealing apparatus 10, hereinafter "the apparatus" of the present invention. The apparatus 10 allows for wires that transverse along a front of a motorcycle 2. Specifically, the apparatus 10 is formed integral with each of handlebars 14 and a riser 12 and protects any wires extending therethrough. The handle bars 14 are secured to the first end of the riser 12 by a riser cap 18. The riser cap 18 will be discussed hereinafter with specific reference to FIG. 3. The riser cap is secured by a billet cover 22 having the shape and size of the riser cap 18. The billet cover 22 includes a first side that is substantially flat and further includes a stud 24 extending upwardly from a side opposite the first side. The stud 24 is preferably threaded and is received within a stud aperture 20 positioned at substantially a center point of the riser cap 18. The stud 24 of the billet cover 22 may be rotatably secured within the stud aperture 20. However, this method of securing the billet cover to the riser cap 18 is described for purposes of example only and any means of securing the billet cover 22 to the riser cap may be used.

At an end opposite the rider cap 18 the riser 12 is connected to a wheel guard 16. The riser 12 is connected to the wheel guard 16 by a bolt 26 having a channel 30 extending therethrough. Positioned between the bolt 26 is a washer 28 and a lock-nut 29. The bolt 26 includes a thread 27 for receipt by a corresponding aperture in the riser 12.

The apparatus 10 of the present invention allows wires that transverse the front end of the motorcycle 2 to be secured therein in order to prevent any damage thereto. Additionally, the apparatus 10 provides the motorcycle with a clean and neat appearance by consolidating the wires contained therein.

Figure 2:
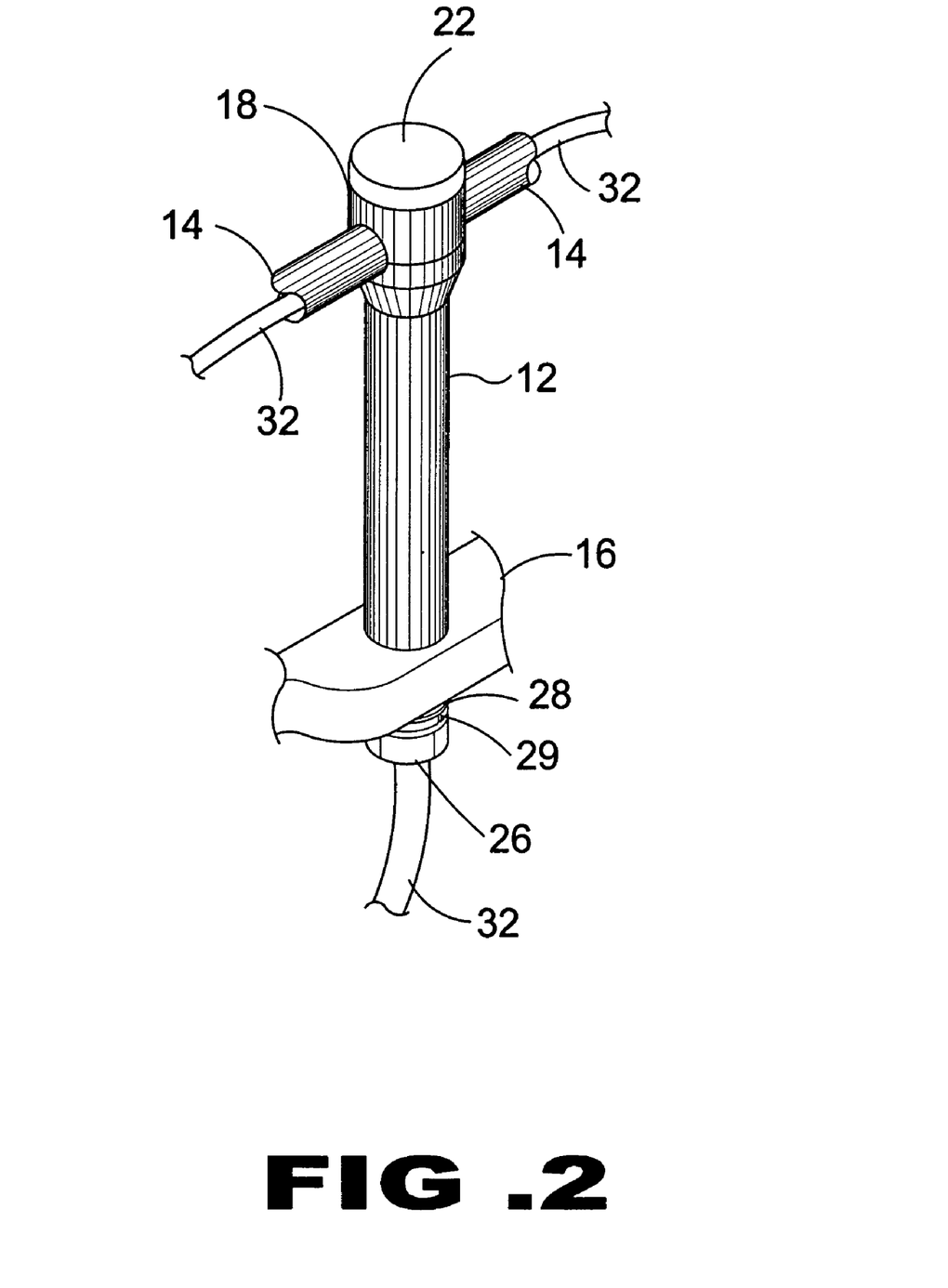
FIG. 2 is a perspective view of the wiring concealing apparatus of the present invention assembled.

FIG. 2 is a perspective view of the wiring concealing apparatus of the present invention assembled. The apparatus 10 is formed integral with each of the handlebars 14 and the riser 12 and protects any wires extending therethrough. The handle bars 14 are secured to the first end of the riser 12 by a riser cap 18. The riser cap 18 will be discussed hereinafter with specific reference to FIG. 3. The riser cap is secured by a billet cover 22 having the shape and size of the riser cap 18. The billet cover 22 includes a first side that is substantially flat and further includes a stud 24 extending upwardly from a side opposite the first side as discussed hereinabove with specific reference to FIG. 1. The billet cover 22 is shown secured to the riser cap 18.

At an end opposite the rider cap 18 the riser 12 is connected to a wheel guard 16. The riser 12 is connected to the wheel guard 16 by a bolt 26 having a channel 30 extending therethrough. Positioned between the bolt 26 is a washer 28 and a lock-nut 29. The bolt 26 includes a thread 27 for receipt by a corresponding aperture in the riser 12.

The apparatus 10 of the present invention is shown having wires 32 extending through each of the handle bars 14 and the riser 12 and further extending out from the aperture 30 of the bolt 26. The wires 32 are consolidated and concealed within the apparatus 10 of the present invention and the apparatus 10 provides the motorcycle with a clean and neat appearance. Additionally, the apparatus 10 prevents any unwanted entanglement of the wires 32 with any moveable parts of the front end of the motorcycle.

Figure 3:
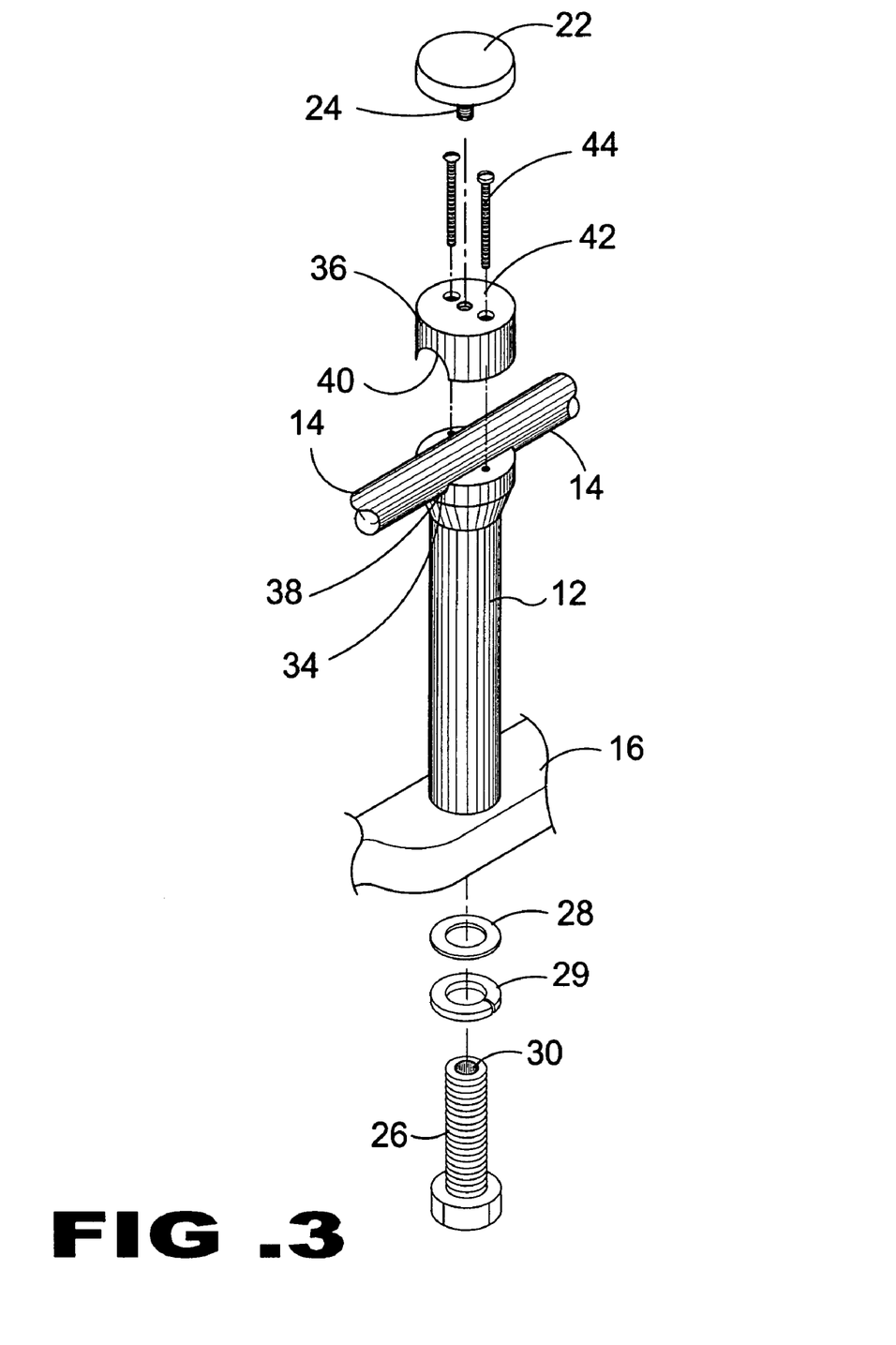
FIG. 3 is an exploded perspective view of the wiring concealing apparatus of the present invention.
Figure 4:
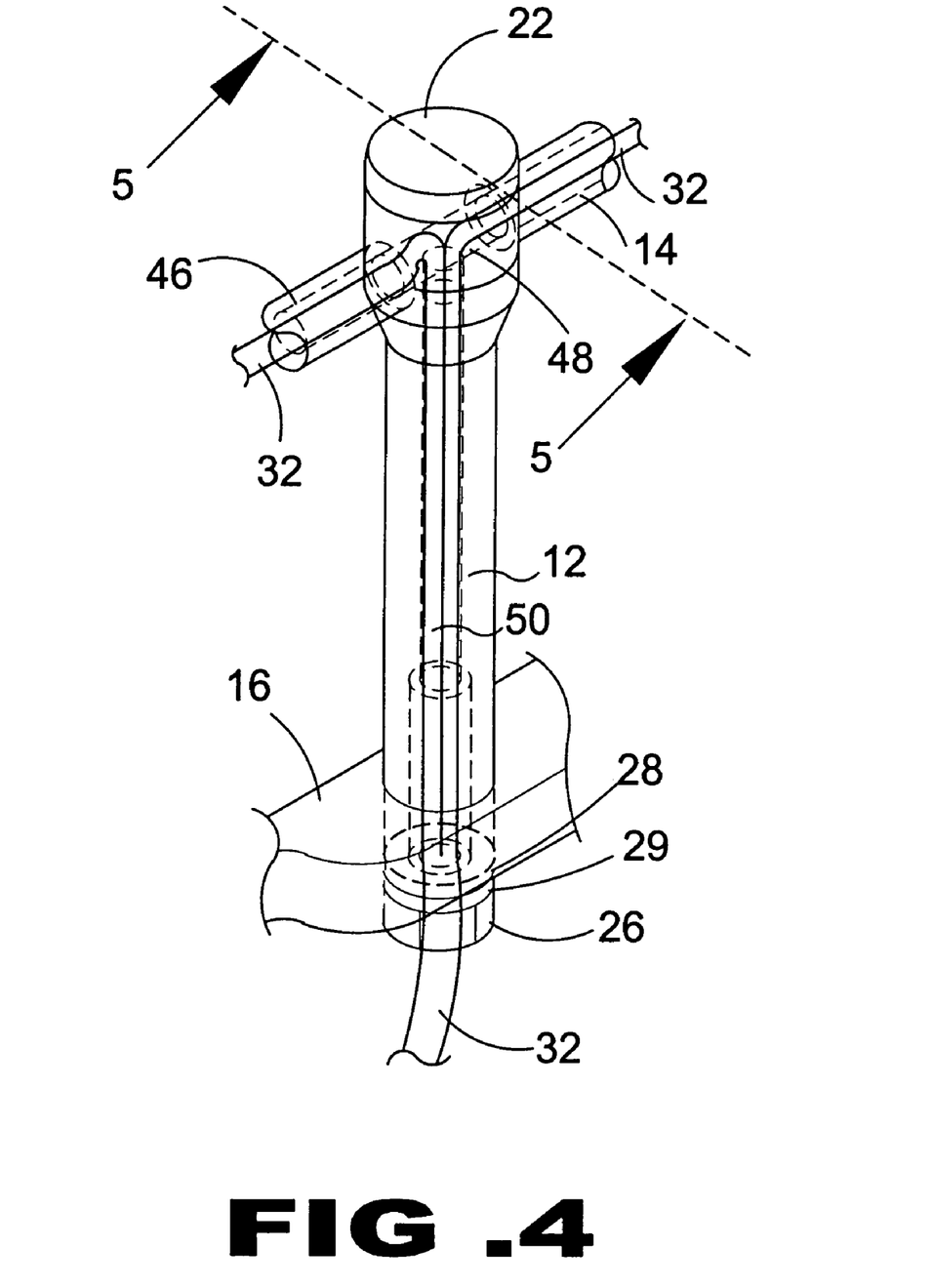
FIG. 4 is a perspective interior view of the wiring concealing apparatus of the present invention.

FIG. 3 is an exploded perspective view of the wiring concealing apparatus of the present invention. The apparatus 10 is formed integral with each of the handlebars 14 and the riser 12 and protects any wires extending therethrough. The handle bars 14 are secured to the first end of the riser 12 by a riser cap 18. The riser cap 18 includes a top cap 36 having a half-moon shaped cut-out 40. The top cap 36 includes a second half-moon shaped cut-out 40 (not shown). The cut-outs 40 are aligned 180 degrees from one another and partially receive the handle bar 14 therein. The top cap 36 also includes at least one bolt aperture 42 extending through a top side thereof. The riser cap 18 further includes a bottom cap 34 having substantially the same shape as the top cap 36. The bottom cap 34 includes a half-moon shaped channel 38 extending through substantially a midpoint thereof. The channel 38 receives the handle bars 14 therein for support thereof. The channel 38 further includes an egress aperture 48 as shown in FIG. 4 for allowing egress of wires extending through the handle bars 14. The bottom cap 34 further includes bolt apertures 42. Upon positioning the top cap 36 on the bottom cap 34, the handle bars 14 are retained securely therebetween. Preferably, the half-moon cutouts 40 and the channel 38 have a circumference substantially equal to the circumference of the handle bar 14. Additionally the bolt apertures 42 in each of the top cap 36 and the bottom cap 34 are aligned with one another and at least one riser bolt 44 is received therethrogh for securing the top cap 36 to the bottom cap 34. The riser cap 18 is completed by having the billet cover 22. The billet cover 22 is formed in the shape and size of the top cap 36 of the riser cap 18. The billet cover 22 includes a first side that is substantially flat and further includes the stud 24 extending upwardly from a side opposite the first side. The stud 24 is preferably threaded and is received within a stud aperture 20 positioned at substantially a center point of the riser cap 18. The stud 24 of the billet cover 22 may be rotatably secured within the stud aperture 20. However, this method of securing the billet cover to the riser cap 18 is described for purposes of example only and any means of securing the billet cover 22 to the riser cap may be used.

At an end opposite the rider cap 18 the riser 12 is connected to a wheel guard 16. The riser 12 is connected to the wheel guard 16 by a bolt 26 having a channel 30 extending therethrough. Positioned between the bolt 26 is a washer 28 and a lock-nut 29. The bolt 26 includes a thread 27 for receipt by a corresponding aperture in the riser 12.

FIG. 4 is a perspective interior view of the wiring concealing apparatus 10 of the present invention. Shown herein, the riser cap 18 secures the handlebars 14 to the riser 12. Additionally, the riser 12 is connected to the wheel guard 16 by the bolt 26 having the throughbore 30. The washer 28 and lock-nut 29 are positioned between the head of the bolt 26 and an underside of the wheel guard 16. The wires 32 extend through the handlebars 14 and down through the riser 12. Handle bar channel 46 extends along a length of the handle bar 14 and the wires 32 extend through the channel 46. The egress aperture 48 positioned at substantially a center point of the handle bar channel 46 and handle bars 14 allow for egress of wires 32 therefrom. The egress aperture 48 is aligned with an opening of the riser 12 having a riser channel 50 extending therethough. The wires 32 extend along the riser channel 50 and further through the throughbore 30 of the bolt 26. The wires 32 further extend out from the bolt 26 and continue to the requisite mechanical and electrical parts to which the are connected.

Preferably, the handlebar channel 46 and the riser channel 50 are hermetically sealed within each of the handlebars 14 and the riser 12 thereby protecting the wires 32 that are extending therealong. Additionally the channels 46,50 should be substantially smooth thereby allowing for easy maneuvering of the wires 32 within the apparatus 10 of the present invention.

Figure 5:
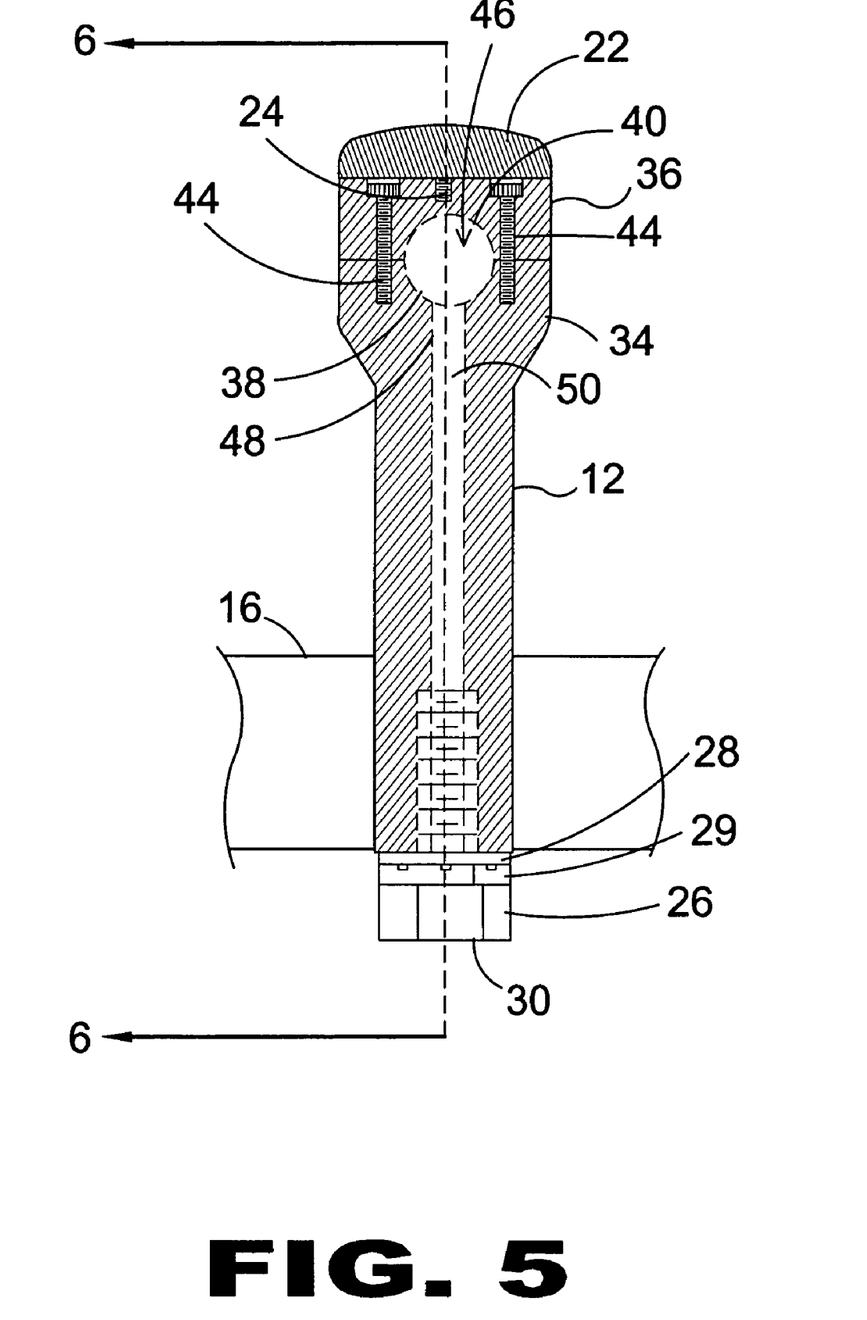
FIG. 5 is a cross-sectional view of the wiring concealing apparatus of the present invention taken along the line labeled 5—5 in FIG. 4.

FIG. 5 is a cross-sectional view of the wiring concealing apparatus 10 of the present invention taken along the line labeled 5—5 in FIG. 4. The apparatus 10 is formed integral with each of the handlebars 14 and the riser 12 and protects any wires extending therethrough. The handle bars 14 are secured to the first end of the riser 12 by a riser cap 18. The riser cap 18 includes a top cap 36 having a half-moon shaped cut-out 40. The top cap 36 includes a second half-moon shaped cut-out 40 (not shown). The cut-outs 40 are aligned 180 degrees from one another and partially receive the handle bar 14 therein. The top cap 36 also includes at least one bolt aperture 42 extending through a top side thereof. The riser cap 18 further includes a bottom cap 34 having substantially the same shape as the top cap 36. The bottom cap 34 includes a half-moon shaped channel 38 extending through substantially a midpoint thereof. The channel 38 receives the handle bars 14 therein for support thereof. The channel 38 further includes an egress aperture 48 as shown in FIG. 4 for allowing egress of wires extending through the handle bars 14. The bottom cap 34 further includes bolt apertures 42. Upon positioning the top cap 36 on the bottom cap 34, the handle bars 14 are retained securely therebetween. Preferably, the half-moon cutouts 40 and the channel 38 have a circumference substantially equal to the circumference of the handle bar 14. Additionally the bolt apertures 42 in each of the top cap 36 and the bottom cap 34 are aligned with one another and at least one riser bolt 44 is received therethrough for securing the top cap 36 to the bottom cap 34. The riser cap 18 is completed by having the billet cover 22. The billet cover 22 is formed in the shape and size of the top cap 36 of the riser cap 18. The billet cover 22 includes a first side that is substantially flat and further includes the stud 24 extending upwardly from a side opposite the first side. The stud 24 is preferably threaded and is received within a stud aperture 20 positioned at substantially a center point of the riser cap 18. The stud 24 of the billet cover 22 may be rotatably secured within the stud aperture 20. However, this method of securing the billet cover to the riser cap 18 is described for purposes of example only and any means of securing the billet cover 22 to the riser cap may be used.

At an end opposite the rider cap 18 the riser 12 is connected to a wheel guard 16. The riser 12 is connected to the wheel guard 16 by a bolt 26 having a channel 30 extending therethrough. Positioned between the bolt 26 is a washer 28 and a lock-nut 29. The bolt 26 includes a thread 27 for receipt by a corresponding aperture in the riser 12.

Figure 6:
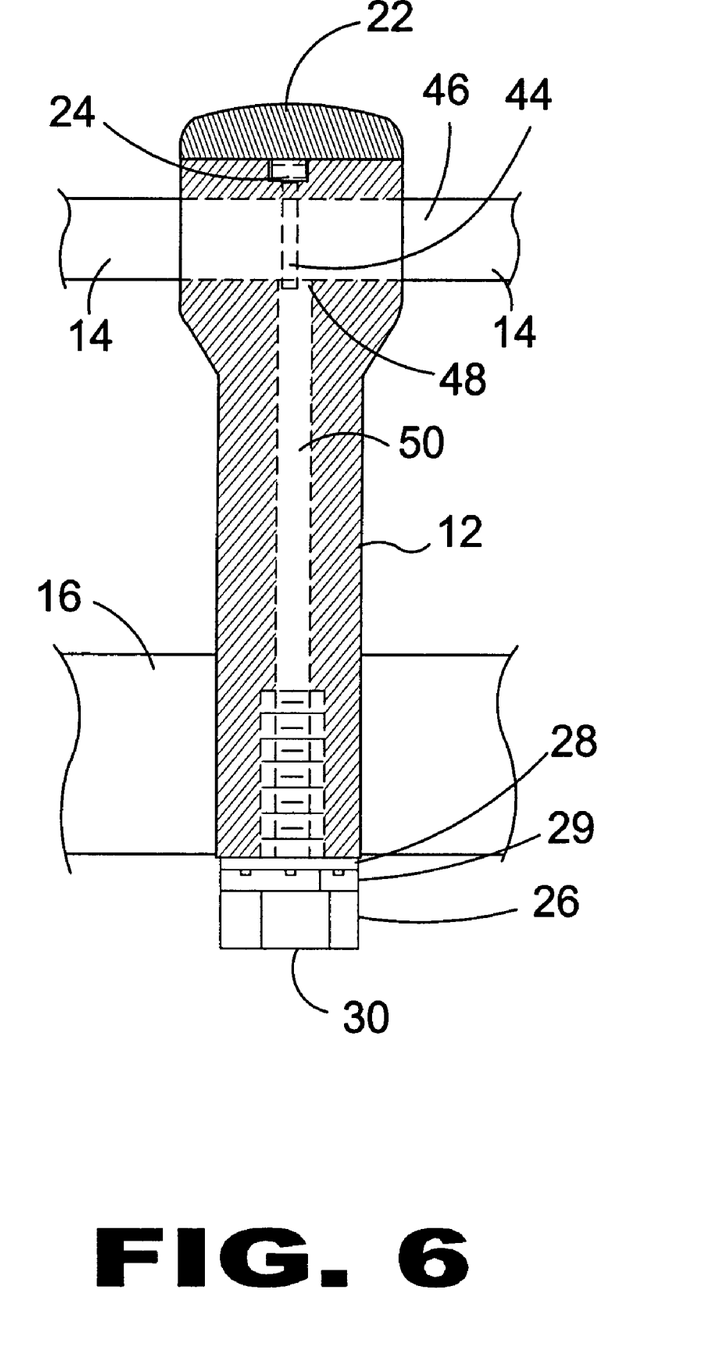
FIG. 6 is a cross-sectional view of the wiring concealing apparatus of the present invention taken along the line labeled 6—6 in FIG. 5.

FIG. 6 is a cross-sectional view of the wiring concealing apparatus 10 of the present invention taken along the line labeled 6—6 in FIG. 5. The apparatus 10 is formed integral with each of the handlebars 14 and the riser 12 and protects any wires extending therethrough. The handle bars 14 are secured to the first end of the riser 12 by a riser cap 18. The riser cap 18 includes a top cap 36 having a half-moon shaped cut-out 40. The top cap 36 includes a second half-moon shaped cut-out 40 (not shown). The cut-outs 40 are aligned 180 degrees from one another and partially receive the handle bar 14 therein. The top cap 36 also includes at least one bolt aperture 42 extending through a top side thereof. The riser cap 18 further includes a bottom cap 34 having substantially the same shape as the top cap 36. The bottom cap 34 includes a half-moon shaped channel 38 extending through substantially a midpoint thereof. The channel 38 receives the handle bars 14 therein for support thereof. The channel 38 further includes an egress aperture 48 as shown in FIG. 4 for allowing egress of wires extending through the handle bars 14. The bottom cap 34 further includes bolt apertures 42. Upon positioning the top cap 36 on the bottom cap 34, the handle bars 14 are retained securely therebetween. Preferably, the half-moon cutouts 40 and the channel 38 have a circumference substantially equal to the circumference of the handle bar 14. Additionally the bolt apertures 42 in each of the top cap 36 and the bottom cap 34 are aligned with one another and at least one riser bolt 44 is received therethrough for securing the top cap 36 to the bottom cap 34. The riser cap 18 is completed by having the billet cover 22. The billet cover 22 is formed in the shape and size of the top cap 36 of the riser cap 18. The billet cover 22 includes a first side that is substantially flat and further includes the stud 24 extending upwardly from a side opposite the first side. The stud 24 is preferably threaded and is received within a stud aperture 20 positioned at substantially a center point of the riser cap 18. The stud 24 of the billet cover 22 may be rotatably secured within the stud aperture 20. However, this method of securing the billet cover to the riser cap 18 is described for purposes of example only and any means of securing the billet cover 22 to the riser cap may be used.

At an end opposite the rider cap 18 the riser 12 is connected to a wheel guard 16. The riser 12 is connected to the wheel guard 16 by a bolt 26 having a channel 30 extending therethrough. Positioned between the bolt 26 is a washer 28 and a lock-nut 29. The bolt 26 includes a thread 27 for receipt by a corresponding aperture in the riser 12.

Figure 7:
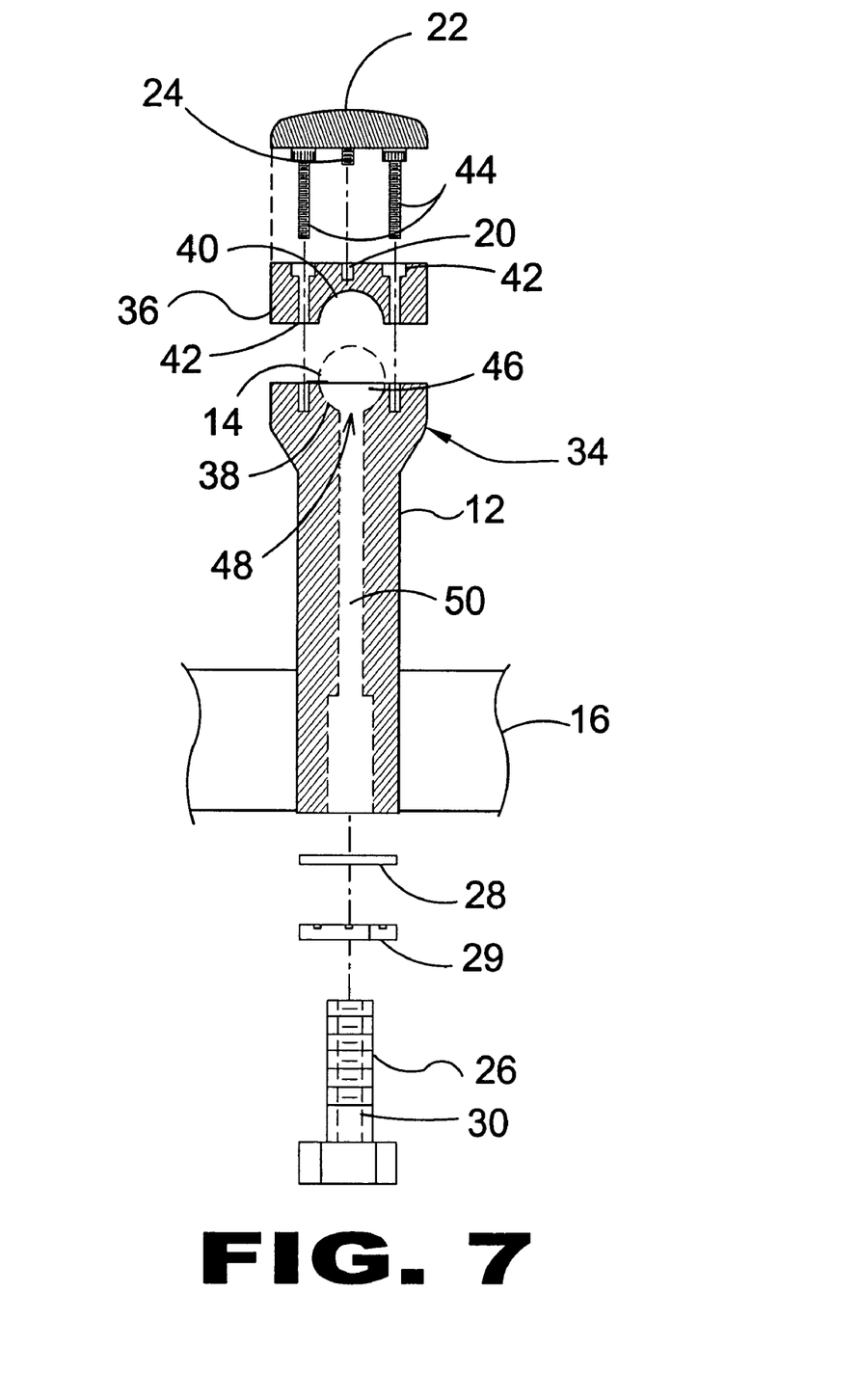
FIG. 7 is an exploded sectional view of the wiring concealing apparatus of the present invention as shown in FIG. 5.

FIG. 7 is an exploded sectional view of the wiring concealing apparatus of the present invention as shown in FIG. 5. The apparatus 10 is formed integral with each of the handlebars 14 and the riser 12 and protects any wires extending therethrough. The handle bars 14 are secured to the first end of the riser 12 by a riser cap 18. The riser cap 18 includes a top cap 36 having a half-moon shaped cut-out 40. The top cap 36 includes a second half-moon shaped cut-out 40 (not shown). The cut-outs 40 are aligned 180 degrees from one another and partially receive the handle bar 14 therein. The top cap 36 also includes at least one bolt aperture 42 extending through a top side thereof. The riser cap 18 further includes a bottom cap 34 having substantially the same shape as the top cap 36. The bottom cap 34 includes a half-moon shaped channel 38 extending through substantially a midpoint thereof. The channel 38 receives the handle bars 14 therein for support thereof. The channel 38 further includes an egress aperture 48 as shown in FIG. 4 for allowing egress of wires extending through the handle bars 14. The bottom cap 34 further includes bolt apertures 42. Upon positioning the top cap 36 on the bottom cap 34, the handle bars 14 are retained securely therebetween. Preferably, the half-moon cutouts 40 and the channel 38 have a circumference substantially equal to the circumference of the handle bar 14. Additionally the bolt apertures 42 in each of the top cap 36 and the bottom cap 34 are aligned with one another and at least one riser bolt 44 is received therethrogh for securing the top cap 36 to the bottom cap 34. The riser cap 18 is completed by having the billet cover 22. The billet cover 22 is formed in the shape and size of the top cap 36 of the riser cap 18. The billet cover 22 includes a first side that is substantially flat and further includes the stud 24 extending upwardly from a side opposite the first side. The stud 24 is preferably threaded and is received within a stud aperture 20 positioned at substantially a center point of the riser cap 18. The stud 24 of the billet cover 22 may be rotatably secured within the stud aperture 20. However, this method of securing the billet cover to the riser cap 18 is described for purposes of example only and any means of securing the billet cover 22 to the riser cap may be used.

At an end opposite the rider cap 18 the riser 12 is connected to a wheel guard 16. The riser 12 is connected to the wheel guard 16 by a bolt 26 having a channel 30 extending therethrough. Positioned between the bolt 26 is a washer 28 and a lock-nut 29. The bolt 26 includes a thread 27 for receipt by a corresponding aperture in the riser 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An apparatus for concealing wires in a riser of a motorcycle comprising:
   a. a throughbore extending along a length of said riser thereby forming a first channel therein;
   b. a handlebar having a second channel extending therethrough and an egress aperture extending through said second channel aligned with a first end of said throughbore; and
   c. a bolt having a bolt channel extending therethough is received within a second end of said throughbore for securing said riser to a wheel guard, wherein wires connecting at least two electronic components are received within said second channel and extend further through said egress apertures and through said throughbore and out from said bolt channel thereby concealing said wires within said handlebars and said riser.

2. The apparatus are recited in claim 1, wherein said first channel is at least one of insulated and waterproof.

3. The apparatus as recited in claim 1, wherein said second channel is at least one of insulated and waterproof.

4. The apparatus as recited in claim 1, further comprising a riser cap connected at said first end of said riser for securing said handle bars to said riser.

5. The apparatus as recited in claim 4, wherein said riser cap includes a third channel for receiving said handlebars therethrough.

6. The apparatus as recited in claim 5, wherein said riser cap further includes a second egress aperture aligned with said first egress aperture for allowing egress of wires in to said throughbore.

7. The apparatus as recited in claim 4, wherein said riser cap is formed from a top cap and a bottom cap releaseably secured to one another via at least one securing bolt.

8. The apparatus as recited in claim 7, wherein said top cap includes a semi-circle shaped channel extending partially through a first side thereof.

9. The apparatus as recited in claim 8, wherein said bottom cap includes a semi-circle shaped channel extending partially through a first side thereof.

10. The apparatus as recited in claim 9, wherein each of said top cap and bottom cap includes at least one securing recess for receiving said at least one securing bolt.

11. The apparatus as recited in claim 10, wherein said first side of said top cap is contacted by said first side of said bottom cap and said at least one securing recesses are aligned and secured by said at least one securing bolt.

12. The apparatus as recited in claim 11, further comprising a third channel formed from said semi-circular channels of each of said top cap and said bottom cap, wherein said handlebar is received by said third channel for securing thereof.

13. The apparatus as recited in claim 12, wherein said bottom cap further comprises a second egress aperture positioned at substantially a center point thereof, said second egress aperture is aligned with said first egress aperture of said handlebar.

14. The apparatus as recited in claim 1, further comprising a washer and a locking nut positioned between said bolt and said wheel guard for securing said bolt within said second end of said first channel.

15. A method of concealing wires within the handlebars and riser of a motorcycle comprising the activity of:
   a. drilling a throughbore through the riser thereby forming a first channel therein;
   b. drilling a second throughbore through a handlebar forming a second channel extending therethrough;
   c. forming an egress at substantially a center point of the second channel;
   d. aligning the egress aperture with a first end of the first channel;
   e. connecting the handlebars to the first end of the riser;
   f. connecting the riser to a wheel guard;
   g. running wires through the second channel, the egress aperture and further through the first channel for egress from a second end of the first channel thereby allowing connection of at least one electrical component to at least one other electrical component thereby concealing the connecting wires in the handlebars and the riser.

16. The method as recited in claim 15, wherein said activity of connecting the handlebars further includes the activity of inserting the handlebars through a channel extending through a riser cap having a second egress aperture extending through the channel thereof.

17. The method as recited in claim 16, further comprising the activity of aligning the first egress aperture with the second egress aperture.

* * * * *